United States Patent Office 3,835,086
Patented Sept. 10, 1974

3,835,086
POLYMERIC DISPERSIONS OF PRESSURE-SENSITIVE ADHESIVES AND PROCESS
Eduard Bergmeister, Peter Ludwig, Hubert Wiest, and Klaus Hafener, Burghausen, Germany, assignors to Wacker-Chemie G.m.b.H., Munich, Germany
No Drawing. Filed June 13, 1972, Ser. No. 262,327
Claims priority, application Germany, Aug. 13, 1971, P 21 40 721.6
Int. Cl. C08f 45/28, 47/20; C09j 3/14
U.S. Cl. 260—33.6 UA
6 Claims

ABSTRACT OF THE DISCLOSURE

A polymeric dispersion of a pressure-sensitive adhesive consisting essentially of (A) from 30% to 80% by weight of saturated hydrocarbons boiling between 40° C. and 250° C. with up to 20% by volume of aromatic hydrocarbons and (B) from 20% to 70% by weight of a polymer dispersed therein having a polymeric content based on the monomers consisting essentially of (1) from 40% to 70% by weight, based on the dried weight of said polymer, of vinyl acetate, (2) from 10% to 50% by weight, based on the dried weight of said polymer, of ethylene, (3) from 0.1% to 5% by weight, based on the dried weight of said polymer, of a monomer having at least two olefinic double bonds and from 5 to 20 carbon atoms, and (4) from 0 to 40% by weight, based on the dried weight of said polymer, of a monomer having one olefinic double bond selected from the group consisting of acrylic acid esters of alkanols having 3 to 18 carbon atoms, and vinyl esters of alkanoic acids having 3 to 18 carbon atoms; as well as the process of preparation and the use of the same in preparing pressure-sensitive adhesive coatings.

THE PRIOR ART

Pressure-sensitive adhesives are mostly applied on the most varied carrier substances and thus used in the form of adhesive tape or adhesive foils. With the application of a slight pressure, they adhere instantaneously to the most varied substrates. To be most effective, they are supposed to be again removable from the substrate, to which they were applied, by stripping without residues or only with destruction of the substrate. The capacity to develop an instantaneous adhesion is determined by the stickiness or "tack." The property of a clean separation or of the thereby occurring destruction of the substrate is determined by the inner solidity or by the cohesion strength of the pressure-sensitive adhesive. It is obvious, that for pressure-sensitive adhesives simultaneously high stickiness and high cohesive strength are desired.

As pressure-sensitive adhesive cements, organic solutions and aqueous dispersions of elastomer-resin mixtures and of permanently sticky thermoplastics are used. Frequently for the attainment of definite properties, fillers, plasticizers, solid and soft resins are admixed.

The disadvantage of the application of these pressure-sensitive adhesives in organic solvents is, that only a low solids content can be used. With a high solids content, the viscosity of the adhesives cement becomes too great. In the use of aqueous dispersions, the pressure-sensitive adhesive layer becomes hygroscopic and, in addition, the swelling of carrier materials or substrates, capable of being swelled by water, such as paper and textiles, occurring thereby, causes disturbances in the coatings.

Furthermore, pressure-sensitive adhesives based on elastomers are not stable to aging and thus their application is very limited. Pressure-sensitive adhesives, which consist mainly of thermoplastics, possess on the other hand only little cohesive strength and tend to cold flow.

OBJECTS OF THE INVENTION

An object of the present invention is the development of a polymeric dispersion of a pressure-sensitive adhesive which simultaneously has, on application, a high stickiness and a high cohesive strength, and avoids the drawbacks of the prior art.

Another object of the present invention is the development of a polymeric dispersion of a pressure-sensitive adhesive consisting essentially of (A) from 30% to 80% by weight of saturated hydrocarbons boiling between 40° C. and 250° C. with up to 20% by volume of aromatic hydrocarbons and (B) from 20% to 70% by weight of a polymer dispersed therein having a polymeric content based on the monomers consisting essentially of (1) from 40% to 70% by weight, based on the dried weight of said polymer, of vinyl acetate, (2) from 10% to 50% by weight, based on the dried weight of said polymer, of ethylene, (3) from 0.1% to 5% by weight, based on the dried weight of said polymer, of a monomer having at least two olefinic double bonds and from 5 to 20 carbon atoms, and (4) from 0 to 40% by weight, based on the dried weight of said polymer, of a monomer having one olefinic double bond selected from the group consisting of acrylic acid esters of alkanols having 3 to 18 carbon atoms, and vinyl esters of alkanoic acids having 3 to 18 carbon atoms.

A yet further object of the present invention is the development of a process for the preparation of the above polymeric dispersion of a pressure-sensitive adhesive in situ.

A still further object of the invention is the development of a process for the preparation of pressure-sensitive adhesive coatings on substrates by applying the above polymeric dispersion of a pressure-sensitive adhesive to a substrate and removing the organic solvent.

These and other objects of the invention will become more apparent as the description thereof proceeds.

DESCRIPTION OF THE INVENTION

The invention now relates to a polymeric dispersion of a pressure-sensitive adhesive or a pressure-sensitive adhesive cement, containing:
(1) 30% to 80% by weight, preferably 40% to 65% by weight of aliphatic and/or cycloaliphatic hydrocarbons, and
(2) 70% to 20% by weight, preferably 60% to 35% by weight of a polymer, consisting of
   (a) 40% to 70% by weight of vinyl acetate
   (b) 10% to 50% by weight of ethylene
   (c) 0.1% to 5% by weight of a monomer having at least two olefinic double bonds
   (d) 0 to 40% by weight of an acrylic ester with an aliphatic alcohol having 3 to 18 carbon atoms and/or a vinyl ester of a carboxylic acid with 3 to 18 carbon atoms.

In particular, the invention relates to a polymeric dispersion of a pressure-sensitive adhesive consisting essentially of (A) from 30% to 80% by weight of saturated hydrocarbons boiling between 40° C. and 250° C. with up to 20% by volume of aromatic hydrocarbons and (B) from 20% to 70% by weight of a polymer dispersed therein having a polymeric content based on the monomers consisting essentially of (1) from 40% to 70% by weight, based on the dried weight of said polymer, or vinyl acetate, (2) from 10 to 50% by weight, based on the dried weight of said polymer, or ethylene, (3) from 0.1% to 5% by weight, based on the dried weight of said polymer, of a monomer having at least two olefinic double bonds and from 5 to 20 carbon atoms, and (4) from 0 to 40% by weight, based on the dried weight of said polymer, of a monomer having one olefinic double bond selected from the group consisting of acrylic acid esters of alkanols having 3 to 18 carbon atoms, and vinyl esters of alkanoic acids having 3 to 18 carbon atoms.

The preparation of stable dispersions of polymers from ethylenically-unsaturated compounds in organic solvents by free-radical polymerization in the presence of stabilizers has been known (see British Pat. 1,009,004). This patent describes the polymerization of ethylenically-unsaturated compounds, such as, vinyl esters, vinyl ethers, vinyl chloride, (meth)acrylic acid esters, olefins and others. The organic dispersion media is frequently a mixture of saturated aliphatic or cycloaliphatic hydrocarbons, particularly benzine. Substances containing a group or groups which solubilize the compound in the organic solvent, and a group or groups which are compatible with the polymer serve principally as stabilizers (dispersion agents). They may be certain monomeric emulsifiers, such as low-molecular-weight polyoxyalkylene glycol esters or ethers of a long-chain carboxylic acid or alcohol, or polymeric protective colloids. Frequently, the stabilizer is only formed by a graft or addition reaction of the monomer(s) on the polymeric precursor.

Those known dispersions are predominantely utilized for the preparation of coatings and dyes.

The polymeric dispersions of pressure-sensitive adhesives according to the invention, are prepared by the polymerization of the olefinically-unsaturated monomers in aliphatic and/or cycloaliphatic hydrocarbons in the presence of oil-soluble free radical initiators and stabilizers. The process is characterized in that at temperatures of 20° to 80° C. and a pressure of 10 to 80 atm., the monomers are mixed-polymerized to give a mixed polymer containing:

(a) 40% to 70% by weight, base on the total monomer amount in the polymer, of vinyl acetate
(b) 10% to 50% by weight, based on the total monomer amount in the polymer, of ethylene
(c) 0.1% to 5% by weight, based on the total monomer amount in the polymer, of at least one double olefincially unsaturated monomer
(d) 0 to 40% by weight, based on the total monomer amount in the polymer, of an acrylic ester of an aliphatic alcohol with 3 to 18 carbon atoms and/or of a vinyl ester of a carboxylic acid with 3 to 18 carbon atoms.

The charging recipe to obtain the above range of monomer content in the polymer requires excess ethylene, as is well known. The amount of the excess depends on the polymerization conditions and can be readily determined. Ordinarily, 1 to 3 times the amount of ethylene monomer desired in the total weight of the polymer is charged. The excess ethylene is removed from the polymerization autoclave and recycled.

The dispersions obtained according to the invention, are particularly suitable for the preparation of permanently sticky coatings. The good stickiness and good cohesive strength of the thermoplastic, stable to aging, which is contained in the dispersion is thereby of great advantage. In addition, dispersions with a high solids content can be prepared, so that no great amounts of dispersion media have to be removed in the processing.

The polymeric dispersions of pressure-sensitive adhesives of the invention thus combine the advantages of all the presently known pressure-sensitive adhesive cements, without possessing their disadvantages. Thus, they are processable with a high solids content without the disadvantages of the aqueous adhesive dispersions. They have a quickly evaporating dispersion media as the dissolving cement, without having to abandon a high solids content. In addition, they show the good aging stability of adhesives based on thermoplastics as well as the good adhesive properties of the elastomer adhesives.

Mainly esters and ethers of unsaturated acids and unsaturated alcohols are utilized for the at least double olefinically-unsaturated monomer (or monomer having at least two olefinic double bonds). These olefinically-unsaturated double bonds should not be conjugated double bonds, and preferably are separated by at least one oxygn n atom in the form of an ether oxygen or a carbonyloxy oxygen or even a cyanuric acid oxygen. Preferably, esters of alkenoic acids and alkenedioic acids having from 3 to 5 carbon atoms with alkenols having 2 to 3 carbon atoms, such as allyl acrylate, allyl methacrylate, allyl crotonate, vinyl crotonate, diallyl or divinyl esters of maleic acid, fumaric acid and itaconic acid; diesters of saturated aliphatic and aromatic dicarboxylic acids with 2 to 10 carbon atoms with unsaturated alcohols with 2 to 3 carbon atoms, for example, diesters of alkanedioic acid having 2 to 10 carbon atoms and benzene dicarboxylic acids with alkenols having 2 to 3 carbon atoms, such as diallyl adipate, divinyl sebacate or diallyl phthalate; diallyl ether; diethers of alkanediols having 2 to 10 carbon atoms with alkenols having 2 to 3 carbon atoms; or triallyl cyanurate. Also mixtures of these monomers can be used. The amounts, used in polymerization, lie mostly between 0.1% and 5% by weight, preferably 0.3% and 2% by weight, based on the dry weight of the total polymer.

In addition to ethylene, vinyl acetate and one at least double olefinically-unsaturated monomer, also up to 40% by weight, preferably up to 25% by weight, of acrylic esters of aliphatic alcohols, preferably alkanols with 3 to 18 carbon atoms, preferably 4 to 12 carbon atoms, or vinyl esters of carboxylic acids, preferably alkanoic acids with 3 to 18 carbon atoms, preferably 4 to 12 carbon atoms, can be used concomitantly. Examples of such compounds are butyl acrylate, tertiary butyl acrylate, hexyl acrylate, octyl acrylate, 2-ethylhexyl acrylate or lauryl acrylate, vinyl propionate, vinyl butyrate, vinyl caproate, vinyl laurate, vinyl 2-ethylhexoate, vinyl isononanoate, vinyl versatate ("Versatic acid" is a registered trade name of the Shell Company for carboxylic acid mixtures), vinyl stearate, etc.

Among the saturated aliphatic and cycloaliphatic hydrocarbons, which are used as dispersing media in amounts of from 30% to 80% by weight, preferably 40% to 65% by weight, in the polymeric dispersion of the invention, those are preferred whose boiling point lies in the range between 40° to 250° C., particularly 60° to 130° C. For instance, hexane, heptane, octane, nonane, decane, undecane, dodecane, cyclohexane, decalin are suitable, and, for economic reasons, above all, benzines, such as light gasoline, ligroin, mineral spirits (b.p. 90° to 180° C.), where a slight amount of aromatics in the mixture, up to maximum 20% by volume, can be used concomitantly.

Especially suitable as stabilizers are high-molecular-weight compounds, which are soluble in benzine, but also have groups which are compatible with the polymerizate. They can be directly added to the polymerization recipe. Mostly the real stabilizer is formed from a stabilizer precursor, which is grafted on a part of the monomer during the polymerization. Stable dispersions may be obtained, for example, if masticated rubber, polyisoprene or poly-lower-alkylvinyl ether, in pure form or grafted with a vinyl ester, for example, as a copolymerizate of lower-alkylvinyl ether with vinyl ester, are utilized as the stabilizer. Particularly proven good has been polyisobutyl vinyl ether with a K-value from 100 to 120.

It is also possible to use ethylene-vinyl acetate copolymers as stabilizer precursors, for example, with an ethylene content of 65% by weight and a K-value of 60. Furthermore, a part of the dispersions prepared according to the invention, may be charged as stabilizing seed latex. It is likewise also possibe to combine different stabilizers or stabilizer precursors. It may, optionally, be advantageous to use monomeric benzine soluble emulsifiers concomitantly. Here, low-molecular-weight polyglycol esters of higher fatty acids, low-molecular fatty alcohol/polyglycol ethers and phosphoric acid esters of fatty alcohol have proven particularly effective. The polyglycol referred to above is preferably a polyoxyethylene glycol or polyoxypropylene glycol having 2 to 6 oxyalkylene units.

The amount of stabilizers to be applied vary in a wide range, dependent upon their composition, degree of polymerization and cross-linking, and the concentration of the polymer obtained, kind of solvent, required viscosity and stability of the dispersion and finally the kind of stabilizer itself. 0.5 to 20 parts by weight, based on the total monomer amount in the dried polymer as 100 parts by weight, are utilized, and the range from 2 to 5 parts by weight has been proven as particularly advantageous. Mostly the total stabilizer (or stabilizer precursor) is charged, but it may also be favorable to add a part of it or another stabilizer during or even after polymerization.

Conventional oil soluble free radical initiators are employed, for example, organic peroxides, such as benzoyl peroxide, lauroyl peroxide, diacetyl peroxide, t-butyl peroxypivalate, acetylcyclohexanesulfonyl peroxide, acetyl peroxycarbonate, dialkyl peroxydicarbonates, such as, diisopropyl, dicyclohexyl, di-2-ethylhexyl, t-butylcyclohexyl peroxydicarbonates; azocatalysts, such as azodiisobutyronitrile and redox catalysts with, for example, amines, oximes, sulfinic acids, iron acetylacetonate, allylhydrazones. Mostly concentrations between 0.05 to 2 parts by weight, preferably 0.2 to 1 part by weight, for 100 parts of the total monomers in the dried polymer, are used. The catalyst may either be totally charged before polymerization or a part, dissolved in solvents and/or monomers may be dosed in during the reaction, either continuously or periodically.

For the conducting of the process according to the invention, mostly all the monomers and auxiliaries are introduced in a suitable agitator autoclave. The stabilizer, the at least double unsaturated monomer and the catalyst may have precedingly been dissolved in the dispersion media and/or in the monomer. Sometimes it is advantageous to charge only part of the dispersion media and to dose in the residual part during the polymerization continuously or in portions. In this residue, a part of the stabilizer (or stabilizer precursor) and/or of the catalyst may be dissolved. Also the monomers may partly be added during the polymerization reaction.

Dependent upon the amount of the ethylene used for the polymerization, a pressure of between 10 and 80 atm., preferably 25 to 55 atm. is applied. This pressure is either kept constant by continuous or periodic impressing of ethylene, or it is allowed to fall to a lower value, dependent upon the ethylene consumption.

The polymerization temperature is generally kept constant during the total reaction time, and in the range between 20° to 80° C., preferably between 50° and 65° C. The polymerization time ranges primarily from 5 to 40 hours. Solids contents of up to 60% by weight, preferably 35% to 50% by weight, are obtained. Excess ethylene is removed by releasing the pressure, blowing out with an inert gas, or by applying a slight vacuum. The stability of the dispersions is such that a further rise of the solid content after the polymerization by removal of dispersing media, for example by distillation, can be conducted.

The pressure-sensitive adhesive dispersions, according to the invention, may be applied in the conventional application machines by rolling, wiping, spraying or pouring. They may also in wet form be directly applied for cementing. Particularly they are, however, used as permanently sticky films, which are applied on carrier substances and are protected with adhesion paper or removable smooth or embossed plastic films against undesirable adhesion or soiling. The main fields of application lie in the designation of various materials with suitably adapted labels, in the surface improvement with decorative, self-sealing papers, films and wall paper, in the tightening and sealing of cartons and cans with self-sealing tapes, in the insulating and corrosion protection of electrical parts, metal parts and sheets, in the temporary covering with self-sealing tapes, in spray painting as well as in the protection of maps and documents and the repairing of papers with transparent films, which are covered with the pressure-sensitive adhesive coating according to the invention. The pressure-sensitive adhesive coatings are applied in amounts of from 5 gm. to 100 gm. dry weight per square meter to the substrate.

The dispersions form colorless clear polymer films with excellent aging stability (insensitive to light and oxidation). They possess with good stickiness good cohesion strength, exhibit a good heat stability and can be easily separated, without leaving adhesive residues on the substrate.

For the attainment of a definite stickiness, softeners, fillers, resins and thermoplastics or elastomers may also be admixed with the pressure-sensitive adhesive dispersions of the invention.

The following examples are illustrative of the practice of the invention without being deemed limitative in any respect.

EXAMPLES

In the examples, data are given on adhesive power, shearing resistance and hot-peeling resistance the values were determined on adhesive films, which were coated with 25 gm./m.$^2$ (solid content of dispersion), by the following methods.

(1) Adhesive power

Adhesive-film strips, 25 cm. long and 2.5 cm. wide are laid at a length of about 12 cm. on a glass plate and pressed on by ten times rolling down with a roller, weighing 2.4 kg., without applying additional pressure. After a waiting time of 1 minute, the "initial adhesive power" is measured in kp./cm. by peeling off at a peeling velocity of 300 mm./min. In the same manner the adhesive power after a storage time of 24 hours is measured.

(2) Shearing resistance

A 2.5 cm. wide film strip is laid on a 2 cm. long strip of stainless steel, V2A, and pressed on ten times with a roller, weighing 2.4 kg. After a storage time of 30 minutes the film strip, handing vertically downwards, is loaded with 2 kg. and the time to the total shearing off to the strip is determined in minutes.

(3) Hot-peeling resistance

A film strip, 5 cm. wide and 20 cm. long is pressed on a glass plate with a pressing-on roller (2.4 kg. 10 times) and stored for 60 min. at 50° C. Then the glass plate is fixed horizontally, with the film on the underside, in a drier at 50° C. and the film end was located with a 25-gm. weight. The peeling velocity is given in min./cm.

EXAMPLE 1

Into an agitator-autoclave of stainless steel, rinsed before with inert gas and evacuated, the following substances were drawn in:

400 parts by weight of vinyl acetate
100 parts by weight of butyl acrylate
660 parts by weight of a benzine fraction b.p. 60–95° C. with 1% by volume aromatic content
280 parts by weight of a stabilizer solution containing 10% my weight of polyisobutyl vinyl ether having a K-value 120, in benzine (as above)
4 parts by weight of triallyl cyanurate, dissolved in the vinyl acetate
4 parts by weight of tert. butyl perpivalate
260 parts by weight of ethylene This mixture was agitated for 30 hours at 60° C. After cooling and depressurizing to normal, a dispersion was obtained with a polymer content of 40% by weight, which was stable for several months. The polymer dispersion had an ethylene content of 25%, based on the dry weight of the polymer. The polymer particles had an average size of 3 to 5μ. The dispersion had a viscosity of 12,000 cps., measured with a Brookfield RVT at 10 R/min. and dries to a transparent, strong, permanently sticky film. An adhesive film, produced from it by drying, has an initial adhesive power of 0.4 kp./2.5 cm., an adhesive power of 1.0 kp./2.5 cm., a shearing resistance of 60 min. and a hot-peeling resistance of 60 min./cm.

EXAMPLE 2 (COMPARISON TO EXAMPLE 1)

The following recipe was employed, identical with that of Example 1 but without the triallyl cyanurate.

400 parts by weight of vinyl acetate
100 parts by weight of butyl acrylate
260 parts by weight of ethylene
660 parts by weight of benzine fraction b.p. 60–95° C.
280 parts by weight of stabilizer solution as in example 1
4 parts by weight of tert.-butyl perpivalate.

This mixture was agitated for 30 hours at 60° C. After cooling and depressurizing to normal, a dispersion was obtained, which was stable for several months, and which dried to a permanently sticky, smudgy film. An adhesive film, produced from it, had an initial adhesive power of 0.35 kp./2.5 cm. and an adhesive power of 0.5 kp./2.5 cm. The shearing resistance amounts only to 0.05 min., the hot-peeling resistance to only 1 min./cm.

EXAMPLE 3

The following recipe was charged, according to Example 1, 2000 parts by weight of vinyl acetate
500 parts by weight of butyl acrylate
1260 parts by weight of benzine fraction b.p. 60–95° C.
28 parts by weight of triallyl cyanurate
5 parts by weight of tert.-butyl perpivalate
1200 parts by weight of ethylene
140 parts by weight of polyisobutylvinyl ether with a K-value of 120 and agitated for 2 hours at 60° C. Within a further 11 hours 3300 parts by weight of benzine b.p. 60–95° C., and 30 parts by weight of tert.-butyl perpivalate were added continuously at the same temperature. The obtained dispersion was stable, had a solid content of 40% by weight and dried to a transparent permanently strongly sticky film. The polymer dispersion had an ethylene content of 25% based on the dry weight of the polymer. An adhesive film, prepared from it, had an initial adhesive power of 0.5 kp./2.5 cm., an adhesive power of 1.0 kp./2.5 cm., a shearing resistance of over 2 hours and a hot-peeling resistance of 240 min./cm.

EXAMPLE 4 (COMPARISON TO EXAMPLE 3)

The following recipe was charged, identical with Example 3 but without the triallyl cyanurate, according to Example 1, 2000 parts by weight of vinyl acetate
500 parts by weight of butyl acrylate
1200 parts by weight of ethylene
1260 parts by weight of benzine fraction b.p. 60–95° C.
140 parts by weight of polyisobutylvinyl ether with a K-value of 120
5 parts by weight of tert.-butyl perpivalate and agitated for 2 hours at 60° C. The 3300 parts by weight of benzine, b.p. 60–95° C., and 30 parts by weight of tert.-butyl perpivalate were dosed in within 11 hours and the reaction mixture agitated for 13 hours more at 60° C. After cooling and depressurizing to normal, a stable dispersion was obtained, which had a solid content of 40% by weight and dried to a strongly permanently sticky, smudgy film. An adhesive film, prepared from it, has little adhesive power, a shearing resistance of only 0.05 min. and a hot-peeling resistance of only 30 sec./cm.

EXAMPLE 5

According to Example 1, the following recipe was drawn in and heated to 60° C.:

3045 parts by weight of a benzine fraction, b.p. 100–140° C., with 8% by volume of aromatic content
1680 parts by weight of vinyl acetate
720 parts by weight of 2-ethylhexyl acrylate
800 parts by weight of ethylene
45 parts by weight of polyisobutylvinyl ether with a K-value of 120
15 parts by weight of triallyl cyanurate
30 parts by weight of tert.-butyl perpivalate After 25 hours of heating under agitation, a stable dispersion with a solid content of 45% by weight was obtained. The polymer dispersion had an ethylene content of 25%, based on the dry weight of the polymer. The film, obtained by air-drying, was strongly, permanently sticky. The initial adhesive power of a PVC-film, finished with it, is 0.6 kp./2.5 cm., the adhesive power 1.3 kp./2.5 cm., the shearing resistance 50 minutes and the hot-peeling resistance 75 min./cm.

EXAMPLE 6

According to Example 1, the following recipe was drawn in and heated to 60° C.:

2000 parts by weight of vinyl acetate
500 parts by weight of vinyl laurate
1300 parts by weight of ethylene
2630 parts by weight of a benzine fraction, b.p. 60–95° C.
70 parts by weight of polyisobutylvinyl ether with a K-value of 120
70 parts by weight of a carboxylic acid polyglycol ester, a higher fatty acid ester of a low-molecular-weight polyoxyethylene glycol (emulsifier SLS of the Chem. Werke Huls AG)
30 parts by weight of triallyl cyanurate
25 parts by weight of tert.-butyl perpivalate After 15 hours of heating under agitation, 30 parts by weight of tert.-butyl perpivalate and 50 parts by weight of benzine, b.p. 60–95° C., were dosed in. After a total reaction time of 30 hours, the dispersion was cooled, depressurized to normal and agitated for 10 minutes at reduced pressure. The dispersion was stable, had a solid content of 57% by weight, was slightly pasty and dried to a strongly, permanently sticky film. The polymer dispersion had an ethylene content of 25%, based on the dry weight of the polymer. An adhesive film, prepared from it, had an initial adhesive power of 0.6 kp./2.5 cm., an adhesive power of 1.5 kp./2.5 cm., a shearing resistance of 50 minutes and a hot-peeling resistance of 120 min./cm.

The polymerization charge was repeated, however, instead of vinyl laurate, vinyl butyrate was used. An adhesive film, prepared from this dispersion had an initial adhesive power of 0.7 kp./2.5 cm. and an adhesive power of 1.4 kp./2.5 cm.

EXAMPLE 7

According to Example 1, the following recipe was agitated during 18 hours at 60° C.:

2235 parts by weight of a benzine fraction, b.p. 60–95° C.
1200 parts by weight of vinyl acetate
250 parts by weight of butyl acrylate
700 parts by weight of ethylene
35 parts by weight of polyisobutylvinyl ether with a K-value of 120
20 parts by weight of diallyl maleate
20 parts by weight of tert.-butyl perpivalate The dispersion obtained after finishing off was stable, had a solid content of 50.4% by weight and dried to a strongly, permanently sticky film. The polymer dispersion had an ethylene content of 25%, based on the dry weight of the polymer. An adhesive film, prepared from it, had an initial adhesive power of 0.4 kp./2.5 cm., an adhesive power of 0.9 kp./2.5 cm., a shearing resistance of 40 min. and a hot-peeling resistance of 60 min./cm.

EXAMPLE 8

According to Example 1, the following recipe:

2000 parts by weight of vinyl acetate
500 parts by weight of butyl acrylate
4000 parts by weight of a benzine fraction, b.p. 60–95° C.
30 parts by weight of triallyl cyanurate
25 parts by weight of tert.-butyl perpivalate
1300 parts by weight of ethylene
1000 parts by weight of the dispersion, obtained in Example 1 were charged into the reaction vessel and polymerized for 30 hours at 60° C. The dispersion obtained had a solid content of 42% by weight and was adjusted to a 50% by weight solid content by distillation of the benzine under reduced pressure. The concentrated polymer dispersion had an ethylene content of 25%, based on the dry weight of the polymer. The film, obtained by air-drying, was strongly, permanently sticky. An adhesive film, prepared from it, has an initial adhesive power of 0.5 kp./2.5 cm., an adhesive power of 1.2 kp./2.5 cm., a shearing resistance of 50 minutes and a hot-peeling resistance of 60 min./cm.

EXAMPLE 9

According to Example 1, the following recipe:

70 parts by weight of polyisobutylvinyl ether with a K-value of 120
2235 parts by weight of hexane
1000 parts by weight of vinyl acetate
250 parts by weight of butyl acrylate
14 parts by weight of triallyl cyanurate
20 parts by weight of tert.-butyl perpivalate
900 parts by weight of ethylene were charged into the reaction vessel and agitated for 16½ hours at 60° C. The stable dispersion had a solid content of 40.3% by weight and dried to a transparent strongly, permanently sticky film. The polymer dispersion had an ethylene content of 35%, based on the dry weight of the polymer. A PVC film, finished with it, had an initial adhesive power of 0.5 kp./cm., an adhesive power of 1.1 kp./2.5 cm., a shearing resistance of 50 min. and a hot-peeling resistance of 80 min./cm.

EXAMPLE 10

According to Example 1, the following recipe:

140 parts by weight of polyisobutylvinyl ether with a K-value of 120
3560 parts by weight of a benzine fraction, b.p. 60–95° C.
2000 parts by weight of vinyl acetate
500 parts by weight of butyl acrylate
20 parts by weight of vinyl crotonate
30 parts by weight of tert.-butyl perpivalate
1300 parts by weight of ethylene were charged into the reaction vessel and heated at 60° C. for 30 hours. The dispersion obtained had a solid content of 43.5% by weight and dried to a permanently sticky film. The polymer dispersion had an ethylene content of 25%, based on the dry weight of the polymer. An adhesive film, prepared from it, had an adhesive power of 0.9 kp./2.5 cm., a shearing resistance of 40 min. and a hot-peeling resistance of 50 min./cm.

EXAMPLE 11

According to Example 1, the following recipe:

140 parts by weight of polyisobutylvinyl ether with a K-value of 120
2000 parts by weight of vinyl acetate
1260 parts by weight of a benzine fraction b.p. 60–95° C.
2300 parts by weight of ethylene
5 parts by weight of triallyl cyanurate
10 parts by weight of tert.-butyl perpivalate were agitated at 60° C. After 3 hours, 10 parts by weight of tert.-butyl perpivalate and 50 parts by weight of benzine, b.p. 60–95° C. and, after another 17 hours, 3000 parts by weight of benzine b.p. 60–95° C. were dosed in. After a total reaction time of 23 hours, a stable dispersion was obtained with a solid content of 40% by weight, which dried to a strongly, permanently sticky film. The polymer dispersion had an ethylene content of 45%, based on the dry weight of the polymer. An adhesive film, prepared from it, had an initial adhesive power of 0.5 kp./2.5 cm., an adhesive power of 2 kp./2.5 cm., a shearing resistance of 90 minutes, and a hot-peeling resistance of 200 min./cm.

EXAMPLE 12 (COMPARISON TO EXAMPLE 11)

The following recipe was charged, identical with Example 11, but without the triallyl cyanurate, according to Example 1:

140 parts by weight of polyisobutylvinyl ether with a K-value of 120
2000 parts by weight of vinyl acetate
1260 parts by weight of a benzine fraction b.p. 60–95° C.
2300 parts by weight of ethylene
10 parts by weight of tert.-butyl perpivalate and agitated at 60° C. After 3 hours, 10 parts by weight of tert.-butyl perpivalate and 50 parts by weight of benzine, b.p. 60–95° C. and, after another 17 hours, 3000 parts by weight of benzine, b.p. 60–95° C. were dosed in. After a total reaction time of 23 hours, a stable dispersion was obtained with a solid content of 40.5% by weight, which dried to a strongly, permanently sticky, smudgy film. An adhesive film, prepared from it, had a slight adhesive power, a shearing resistance of only 5 minutes and a hot-peeling resistance of only 40 sec./cm.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A polymeric dispersion of pressure-sensitive adhesive consisting essentially of (A) from 30% to 80% by weight of saturated hydrocarbons boiling between 40° C. and 250° C. with up to 20% by volume of aromatic hydrocarbons, (B) from 20% to 70% by weight of a polymer dispersed therein having a polymeric content based on the monomers consisting essentially of (1) from 40% to 70% by weight, based on the dried weight of said polymer, of vinyl acetate, (2) from 10% to 50% by weight, based on the dried weight of said polymer, of ethylene, (3) from 0.1% to 5% by weight, based on the dried weight of said polymer, of a monomer having at least two olefinic double bonds and from 5 to 20 carbon atoms, and (4) from 0 to 40% by weight, based on the dried weight of said polymer, of a monomer having one olefinic double bond selected from the group consisting of acrylic acid esters of alkanols having 3 to 18 carbon atoms, and vinyl esters of alkanoic acids having 3 to 18 carbon atoms, said polymer being dispersed in the presence of (C) from 0.5 to 20 parts by weight, based on the total monomer amount in the dried polymer of a stabilizer compound containing at least one group which solubilizes said stabilizer compound in saturated hydrocarbons and at least one group which is compatible with said polymer.

2. The polymeric dispersion of claim 1 containing from 40% to 65% of component A and from 35% to 60% of component B.

3. The polymeric dispersion of claim 1 wherein said saturated hydrocarbons of component A boil between 60° C. and 130° C., and have a maximum of 10% by volume of aromatic hydrocarbons.

4. The polymeric dispersion of claim 1 wherein said monomer having at least two olefinic double bonds has said double bonds separated by at least one oxygen hetero atom.

5. The polymeric dispersion of claim 4 wherein said monomer having at least two olefinic double bonds is triallyl cyanurate.

6. A process for production of the polymeric dispersion of claim 1 which consists in the steps of polymerizing a monomer charge sufficient to give a polymeric content based on the monomers consisting essentially of (1) from 40% to 70% by weight, based on the dried weight of said polymer, of vinyl acetate, (2) from 10% to 50% by weight, based on the dried weight of said polymer, of ethylene, (3) from 0.1% to 5% by weight, based on the dried weight of said polymer, of a monomer having at least two olefinic double bonds and from 5 to 20 carbon atoms, and (4) from 0 to 40% by weight, based on the dried weight of said polymer, of a monomer having one olefinic double bond selected from the group consisting of acrylic acid esters of alkanols having 3 to 18 carbon atoms and vinyl esters of alkanoic acids havinng 3 to 18 carbon atoms; in said saturated hydrocarbons in an amount sufficient to give said amount of component A, in the presence of from 0.05 to 2 parts by weight, based on the weight of said monomers in the dried polymer, of oil-soluble free radical initiators, and from 0.5 to 20 parts by weight, based on the weight of said monomers in the dried polymer, of stabilizers selected from the group consisting of (a) high-molecular-weight compounds soluble in said saturated hydrocarbons and which have at least one group compatible with the polymerizate produced and (b) high-molecular-weight compounds soluble in said saturated hydrocarbons capable of forming graft polymers with at least one of said monomers giving groups compatible with the polymerizate produced, at a temperature between 20° C. and 80° C., and a pressure between 10 and 80 atm., for a time between 5 to 40 hours, and recovering said polymeric dispersion

References Cited

UNITED STATES PATENTS

| | | | |
|---|---|---|---|
| 3,095,388 | 6/1963 | Osmond et al. | 260—342. |
| 3,166,524 | 1/1965 | Schmidle et al. | 260—34.2 |
| 3,400,103 | 9/1968 | Samour et al. | 117—122 PA |
| 3,445,263 | 5/1969 | Alexander | 117—122 PA |
| 3,617,361 | 11/1971 | Reinhard et al. | 117—122 PA |

FOREIGN PATENTS

| | | | |
|---|---|---|---|
| 1,009,004 | 11/1965 | Great Britain | 260—342. |

ALLAN LIEBERMAN, Primary Examiner

U.S. Cl. X.R.

117—122 PA; 260—34.2